(12) United States Patent
Pellaton

(10) Patent No.: US 9,501,143 B2
(45) Date of Patent: Nov. 22, 2016

(54) SYSTEMS AND METHOD FOR CONTROLLING ELECTRONIC DEVICES USING RADIO FREQUENCY IDENTIFICATION (RFID) DEVICES

(71) Applicant: Eric Pellaton, Carlsbad, CA (US)

(72) Inventor: Eric Pellaton, Carlsbad, CA (US)

(*) Notice: Subject to any disclaimer, the term of this patent is extended or adjusted under 35 U.S.C. 154(b) by 0 days.

(21) Appl. No.: 14/588,711

(22) Filed: Jan. 2, 2015

(65) Prior Publication Data

US 2015/0192993 A1    Jul. 9, 2015

Related U.S. Application Data

(60) Provisional application No. 61/923,501, filed on Jan. 3, 2014, provisional application No. 62/065,404, filed on Oct. 17, 2014.

(51) Int. Cl.
| | | |
|---|---|---|
| *G06F 3/01* | (2006.01) | |
| *G06K 7/10* | (2006.01) | |
| *G08C 17/02* | (2006.01) | |
| *G06K 19/077* | (2006.01) | |

(52) U.S. Cl.
CPC ........... *G06F 3/014* (2013.01); *G06K 7/10366* (2013.01); *G06K 19/07762* (2013.01); *G08C 17/02* (2013.01)

(58) Field of Classification Search
USPC ....................................................... 340/10.5
See application file for complete search history.

(56) References Cited

U.S. PATENT DOCUMENTS

| | | |
|---|---|---|
| 5,796,354 A | 8/1998 | Cartabiano |
| 6,827,281 B2 | 12/2004 | Edmonson |
| 7,042,336 B2 | 5/2006 | Pierce |
| 7,498,956 B2 | 3/2009 | Baier |
| 7,768,409 B2 | 8/2010 | Parias |
| 8,279,039 B2 | 10/2012 | Thorn |
| 8,279,091 B1 | 10/2012 | Tran |
| 8,313,416 B2 | 11/2012 | Ellis |
| 8,315,367 B2 | 11/2012 | Profanchik |
| 8,405,612 B2 | 3/2013 | Kruse |
| 8,587,406 B2 * | 11/2013 | Maltseff ............... G06K 7/0008 340/10.1 |
| 8,937,531 B2 * | 1/2015 | Rimai ................ G06K 7/10069 235/375 |
| 2003/0076968 A1 | 4/2003 | Rast |
| 2006/0158341 A1 | 7/2006 | Chipchase |
| 2007/0055949 A1 | 3/2007 | Thomas |

(Continued)

FOREIGN PATENT DOCUMENTS

| | | | | |
|---|---|---|---|---|
| DE | WO 2009022253 A2 * | 2/2009 | ............... | G06F 3/01 |
| EP | 2066836 | 6/2010 | | |

(Continued)

OTHER PUBLICATIONS

Bainbridge, Rachel et al., "Wireless Hand Gesture Capture through Wearable Passive Tag Sensing", Body Sensor Networks (BSN), 2011 International Conference on, IEEE, (May 23, 2011), pp. 200-204.

(Continued)

*Primary Examiner* — Mark Blouin
(74) *Attorney, Agent, or Firm* — Knobbe Martens Olson & Bear LLP

(57) ABSTRACT

A control system includes an RFID device and an RFID reader antenna configured to receive a signal from the RFID device. The signal is associated with a command. A transmitter transmits the command to an electronic device to operate the electronic device.

20 Claims, 15 Drawing Sheets

(56) References Cited

U.S. PATENT DOCUMENTS

| | | |
|---|---|---|
| 2008/0136775 A1 | 6/2008 | Conant |
| 2008/0180301 A1 | 7/2008 | Aaron |
| 2009/0156309 A1 | 6/2009 | Weston |
| 2010/0097195 A1 | 4/2010 | Majoros |
| 2010/0182160 A1 | 7/2010 | Lu |
| 2012/0075229 A1 | 3/2012 | Summers |
| 2012/0139708 A1* | 6/2012 | Paradiso .............. G06F 3/014 340/10.1 |
| 2012/0249797 A1 | 10/2012 | Haddick |
| 2012/0256732 A1 | 10/2012 | McAllister |
| 2012/0262370 A1 | 10/2012 | Ko |
| 2012/0274508 A1 | 11/2012 | Brown |
| 2012/0309326 A1 | 12/2012 | Maguire |
| 2013/0053007 A1 | 2/2013 | Cosman |

FOREIGN PATENT DOCUMENTS

| | | |
|---|---|---|
| EP | 2066836 B1 | 6/2010 |
| EP | 2191458 | 6/2010 |
| EP | 2191458 A2 | 6/2010 |
| EP | 1908250 | 8/2010 |
| EP | 1908250 B1 | 8/2010 |
| EP | 2446393 | 5/2012 |
| EP | 2446393 A1 | 5/2012 |
| EP | 2486477 | 8/2012 |
| EP | 2486477 A1 | 8/2012 |
| GB | 2492944 | 1/2013 |
| GB | 2492944 A | 1/2013 |
| WO | WO 2009022253 | 2/2009 |
| WO | WO 2009022253 A2 | 2/2009 |
| WO | WO 2012054443 | 4/2012 |
| WO | WO 2012054443 A1 | 4/2012 |

OTHER PUBLICATIONS

Glove-based input interfaces, http://www.angelfire.com/ca7/mellott124/glove1.htm, Last updated: Jun. 18, 1999.
International Search Report and Written Opinion—PCT/US2015/010054, International Search Authority—European Patent Office—Apr. 30, 2015.
Lee, Changwon et al., "Design and Implementation of the wireless RFID Glove for life applications", International Journal of Grid and Distributed Computing, (Sep. 3, 2010).
Vega, Katia et al., "Beauty technology as an interactive computing platform", Proceedings of the 2013 ACM International Conference on Interactive Tabletops and Surfaces, ITS '13, (Oct. 6, 2013), pp. 357-360, New York, New York.

* cited by examiner

| Tag #'s | Command Name | Tag Location |
|---------|--------------|--------------|
| 1 | Start/Stop | Right Thumb |
| 2 | FF | Right Index Finger |
| 3 | Rwd | Right Middle Finger |
| 4 | Vol. + | Right Ring Finger |
| 5 | Vol. - | Right Pointing Finger |

Example of association information that may be stored in memory

- Unique Identifier = Tag #
- Command for Electronic Device = Command Name
- Tag Location = Where the Tag is installed/located

*FIG. 5*

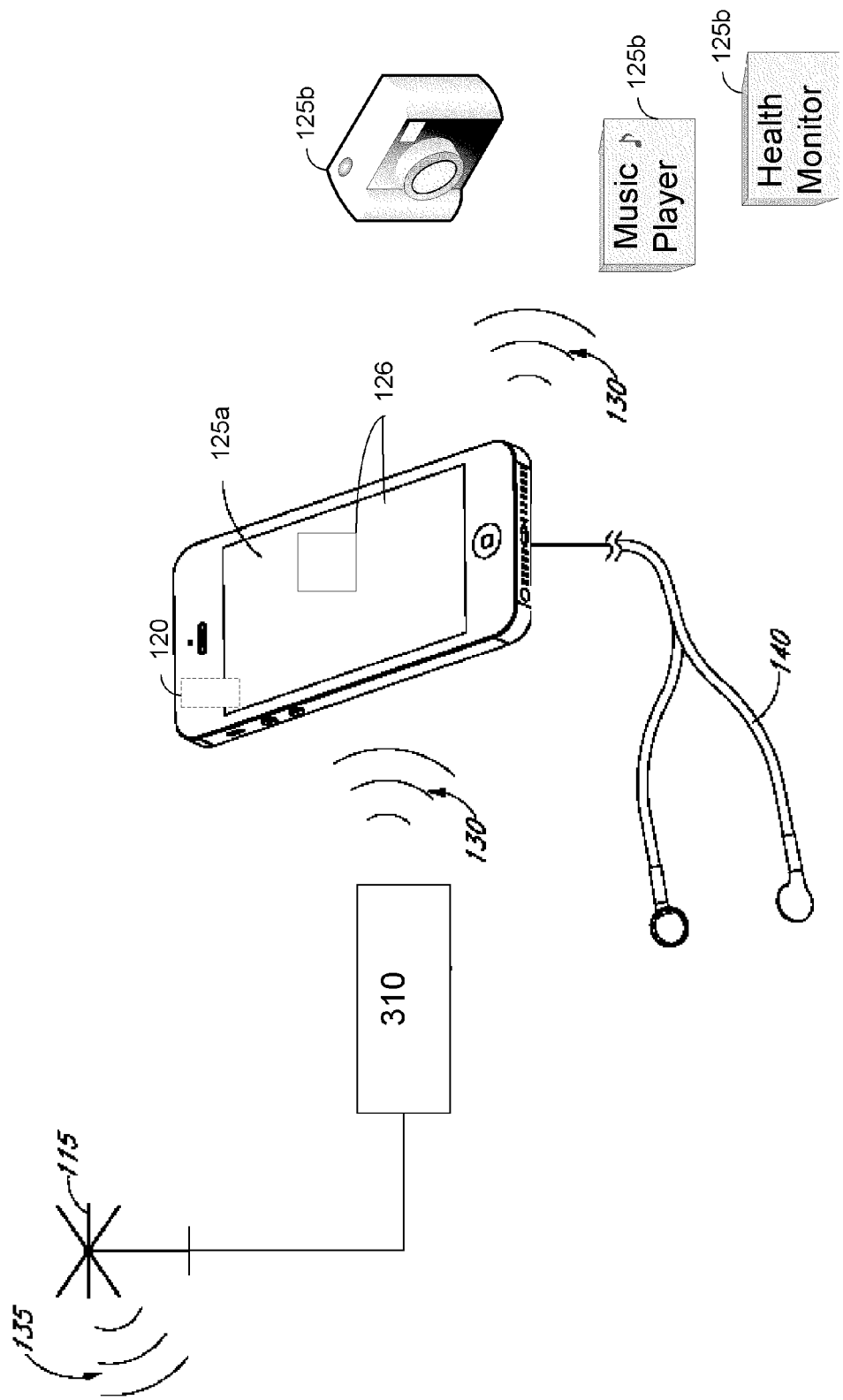

US 9,501,143 B2

SYSTEMS AND METHOD FOR CONTROLLING ELECTRONIC DEVICES USING RADIO FREQUENCY IDENTIFICATION (RFID) DEVICES

CROSS-REFERENCES TO RELATED APPLICATIONS

This application claims priority under 35 U.S.C. §119(e) to U.S. Provisional Patent Application No. 62/065,404 entitled "SYSTEMS AND METHODS FOR CONTROLLING ELECTRONIC DEVICES USING RADIO FREQUENCY IDENTIFICATION (RFID) DEVICES," filed on Oct. 17, 2014, and U.S. Provisional Patent Application No. 61/923,501 entitled "SYSTEMS AND METHODS FOR CONTROLLING ELECTRONIC DEVICES USING RADIO FREQUENCY IDENTIFICATION (RFID) DEVICES," filed on Jan. 3, 2014. All of these applications are incorporated by reference in their entireties. Furthermore, any and all priority claims identified in the Application Data Sheet, or any correction thereto, are hereby incorporated by reference under 37 C.F.R. §1.57.

BACKGROUND

Field of the Invention

The present disclosure relates to systems and methods for controlling electronic devices.

Description of the Related Art

A variety of commercially available electronic devices exist for use during various activities. These electronic devices may include, but are not limited to, music players, cameras, timers, cellular phones, camcorders, and/or radios. Depending on the activity being performed, operation of these devices may be limited or difficult (e.g., gloves may make it difficult to actuate a control button or screen of the device, the environment prohibits exposure of the device when control is desired, etc.). Thus, a method and system of controlling an electronic device which overcomes one or more of these disadvantages is desirable.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments," one will understand how the features of this invention provide several advantages over current designs.

One embodiment is a control system that includes at least one RFID device, an RFID reader antenna configured to receive a signal from the at least one RFID device, an RFID reader configured to decode the received signal, a processor configured to determine at least one command associated with the received signal, and a transmitter configured to transmit the at least one command to at least one electronic device.

Another embodiment is a glove that includes a plurality of RFID devices. Each RFID device is associated with a unique identifier.

Another embodiment is a method for changing a state of an electronic device. The method comprises receiving a signal from at least one RFID device and decoding the received signal into a unique identifier. The method further comprises associating at least one command with the decoded unique identifier and transmitting the at least one associated command.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. Some embodiments will be described in conjunction with the appended drawings, where like designations denote like elements.

FIG. 5 is a chart showing exemplary associations between RFID device unique identifiers and commands for the electronic device.

FIG. 12 depicts an exemplary diagram of an embodiment of a system for simplifying electronic device control using RFID devices wirelessly coupled to the electronic device being controlled.

Figure 1A:
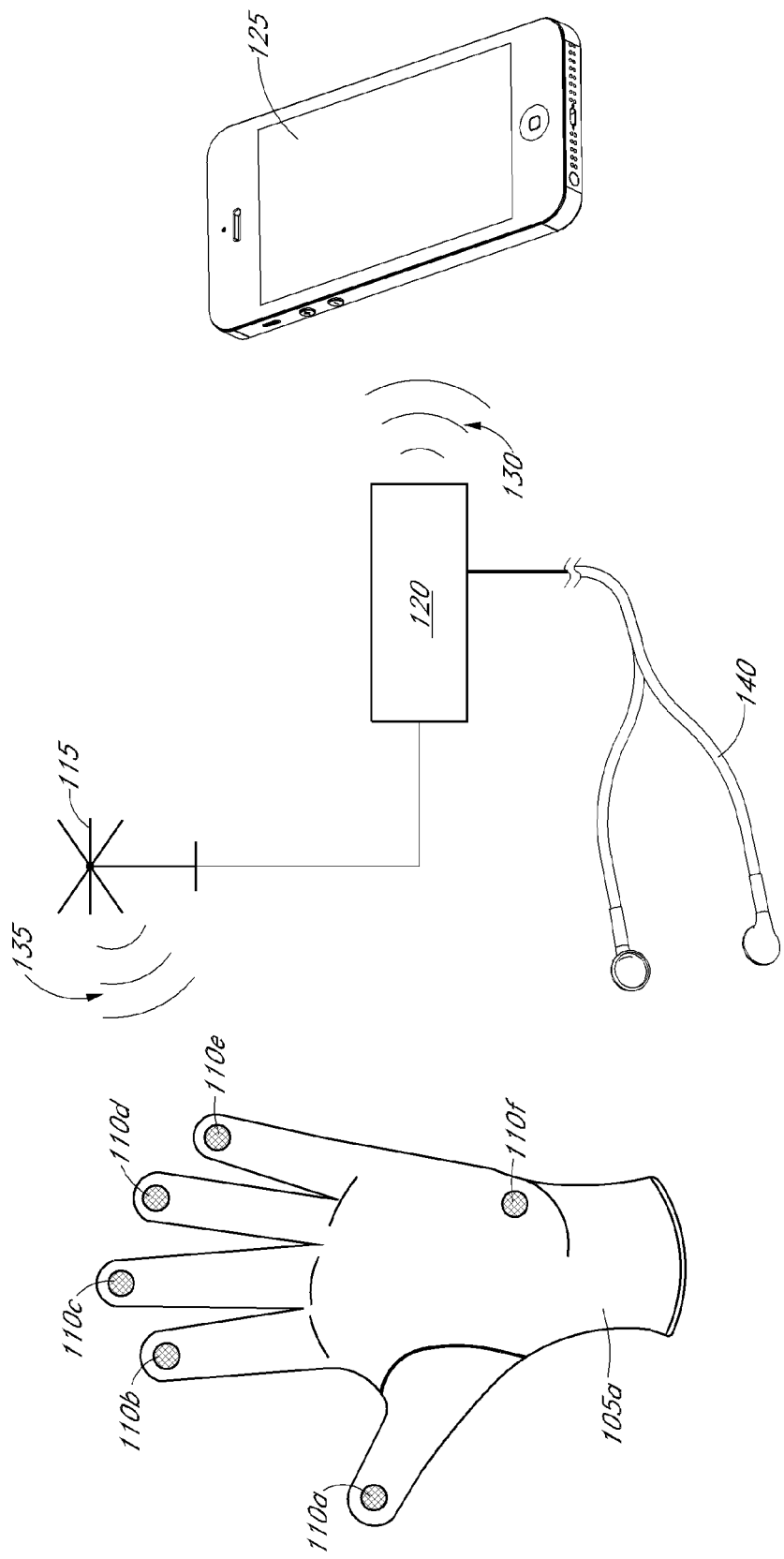
FIG. 1A depicts an exemplary embodiment of a system for simplifying electronic device control using RFID devices.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The terms "first" and "second" are used herein to distinguish among various elements (e.g., "first frequency" and "second frequency") and are not intended to denote any particular order to these elements. The detailed description includes specific details for the purpose of providing a thorough understanding of the exemplary embodiments of the invention. In some instances, some devices are shown in block diagram form.

The preferred embodiments of the invention illustrated and described above are RFID-enabled—that is, they utilize RFID technology to electrically store and communicate certain information (e.g., unique identifiers or the like). RFID technology provides a universal and wireless medium for uniquely identifying objects and for wirelessly exchanging information over short range distances (from near contact to up to a few inches). Commercially available RFID technologies include electronic devices called transponders or tags (herein RFID devices), and reader/writer electronics (herein RFID readers) that provide an interface for communicating with the RFID devices. Most RFID systems communicate via radio signals that carry data either uni-directionally (read only) or, more preferably, bi-directionally (read/write).

FIG. 1A depicts a diagram of an embodiment of a control system 100 that employs RFID devices. The RFID devices 110a-110f control an electronic device 125. The control system 100 may comprise a glove 105a containing therein RFID devices 110a-110f. The RFID devices 110a-110f transmit information to an RFID reader antenna 115. The RFID reader antenna 115 generates a wireless field 135. The RFID reader antenna 115 may be connected to a base unit 120. The base unit 120 may transmit a command associated with a read RFID device 110 to the electronic device 125 via a communication path 130. Of course the system need not include a glove 105a. For example, in certain embodiments the glove 105a is replaced with other articles, such as clothing or objects, to which RFID devices 110a-110f may be attached or installed.

The RFID devices 110a-110f may store information therein to control the electronic device 125. The RFID devices 110a-110f may comprise either passive or active RFID devices. Additionally, the RFID devices 110a-110f may each have unique identifiers (i.e., 110a=1, 110b=2, 110c=3, 110d=4, 110e=5, 110f=6), which may be transmitted when placed in the vicinity of the RFID reader antenna 115. The wireless field 135 may provide for wireless power transfer and data communication. The RFID reader antenna 115 may be external to the base unit 120 and connected to an RFID reader (see FIG. 3) within the base unit 120. In certain embodiments, the RFID reader antenna 115 is disposed within the base unit 120. The base unit 120, in addition to an RFID reader 310, may also comprise a power source connection, controller, memory, transmission circuitry, headphone connection, microphone connection, and on/off switch. The base unit 120 will be discussed in more detail below. The base unit 120 may receive data from the RFID device 110 via the RFID reader antenna 115 and generate a command to transmit to the electronic device 125 via the communication path 130. The electronic device 125 represents the device with which a user wishes to interact. The electronic device 125 may be a music player to which the user wishes to listen or a camera with which the user wishes to take pictures or video. These examples are not meant to be limiting. The communication path 130 may represent the path of communication between the base unit 120 transmission circuitry and the electronic device 125. This communication path 130 may represent any path or mode of communication, wired or wireless, through which data and/or commands may be communicated, for example, but not limited to, Bluetooth, Wi-Fi, Ethernet, near field communications (NFC), etc. In certain embodiments, the base unit 120 sends commands to the electronic device 125 via the communication path 130. In response the electronic device 125 can send, stop, start, etc. the data it sends to the base unit 120, such as desired music, via the communication path 130. The user may connect headphones, ear buds or other audio devices 140 to the base unit 120 to hear the desired music. In certain embodiments, the user connects the headphones, ear buds or other audio device 140 to the electronic device 125. In such an embodiment, the base unit 120 controls the electronic device 125 but need not receive the data desired by the user. The user receives the data directly from the electronic device 125.

The wireless field 135 may represent the volume of space in which wireless power from the RFID reader antenna 115 may be sourced to power the RFID device 110. The wireless field 135 also represents the volume of space in which the RFID reader antenna 115 may detect the RFID devices 110a-110f and receive information from said RFID devices.

The glove 105a is an exemplary article of clothing that may inhibit the use of the electronic device 125 during an activity. By way of example only, the glove 105a depicted in FIG. 1A may be necessary for protecting the user while skiing. However, the bulk of the glove 105a may make it difficult to operate the controls of the electronic device 125. Alternatively, the glove 105a may make it difficult to access the electronic device 125 when the user wants to control it. However, though the glove 105a may hinder use of the electronic device 125, it may also provide the location for installing the RFID devices 110a-110f. As depicted, the RFID devices 110a-110f may be embedded in the fingertips and the base of the palm of the glove 105a such that a user may be able to more easily present the necessary RFID device 110a-110f to the RFID reader antenna 115. Embedding the RFID devices 110a-110f in the glove 105a keeps them protected from damage from use and ensures they are always located in the same place so that the user may know what part of the glove 105a corresponds to a particular RFID device 110a-110f. In another embodiment, the RFID devices 110a-110f are installed on the article of clothing. The unique identifier of a respective RFID device 110a-110f may be broadcast by the RFID device 110a-110f when the respective RFID device 110a-110f is brought within the wireless field 135 of the RFID reader antenna 115. Thus, by placing the index finger of glove 105a within the wireless field 135 near the RFID reader antenna 115, the user may activate RFID device 110b such that the RFID device 110b broadcasts its unique identifier.

The RFID devices 110a-110f may be coded to command the electronic device 125. In an embodiment, the electronic device 125 may be a music player and the RFID devices 110a-110f may each embody one or more commands the music player can perform (i.e., stop, play, rewind, fast forward, pause, volume up, volume down, etc.). Since each RFID device 110a-110f may have a unique identifier, each RFID device 110a-110f may be associated with at least one particular command. Thus, the index finger RFID device 110b may be assigned to the Start/Pause command. The number of commands available may be limited only by the number of commands available on the electronic device 125.

The RFID reader antenna 115 may provide a point or region where the user may locate the desired RFID device 110a-110f such that the desired command is communicated to the electronic device 125. The RFID reader antenna 115 may be placed at or near the base unit 120 or may be located more conveniently for user access. For example, when the user is skiing, the base unit 120 may be located in the pocket of a jacket, while the RFID reader antenna 115 may be more conveniently located on the arm of the jacket. In such an embodiment, the user need only touch the arm (where the RFID reader antenna 115 is located) with a particular RFID device 110a-110f to send a command to the electronic device 125. The electronic device 125 may also be located in the pocket with the base unit 120. In another embodiment, the RFID reader antenna 115 is installed in a ski, motorcycle, or cycling helmet. In such an embodiment, the RFID reader antenna 115 is easily convenient to both hands. In an alternate embodiment, the RFID reader antenna 115 is located on the handlebar of a motorcycle such that a user may easily access it with the glove 105a. In such embodiments, the headphones, ear buds or other audio device 140 can be integrated into the helmet and connected to the base unit 120.

The base unit 120 may comprise the components discussed above and as will be discussed further below. The base unit 120 may be connected to the RFID reader antenna 115. When connected, the RFID reader antenna 115 may source power from the base unit 120 to generate the wireless field 135 and may communicate any information received from the RFID device 110 to the base unit 120. Once the base unit 120 receives the information from the RFID reader antenna 115, it may utilize internal circuitry to convert the RFID device 110 information into a command to the electronic device 125 via communication path 130. In an alternate embodiment, the base until 120 may receive information via the RFID reader antenna 115 to send directly to the electronic device 125, and the base unit 120 may not perform any internal processing of the command via communication path 130.

Figure 1B:
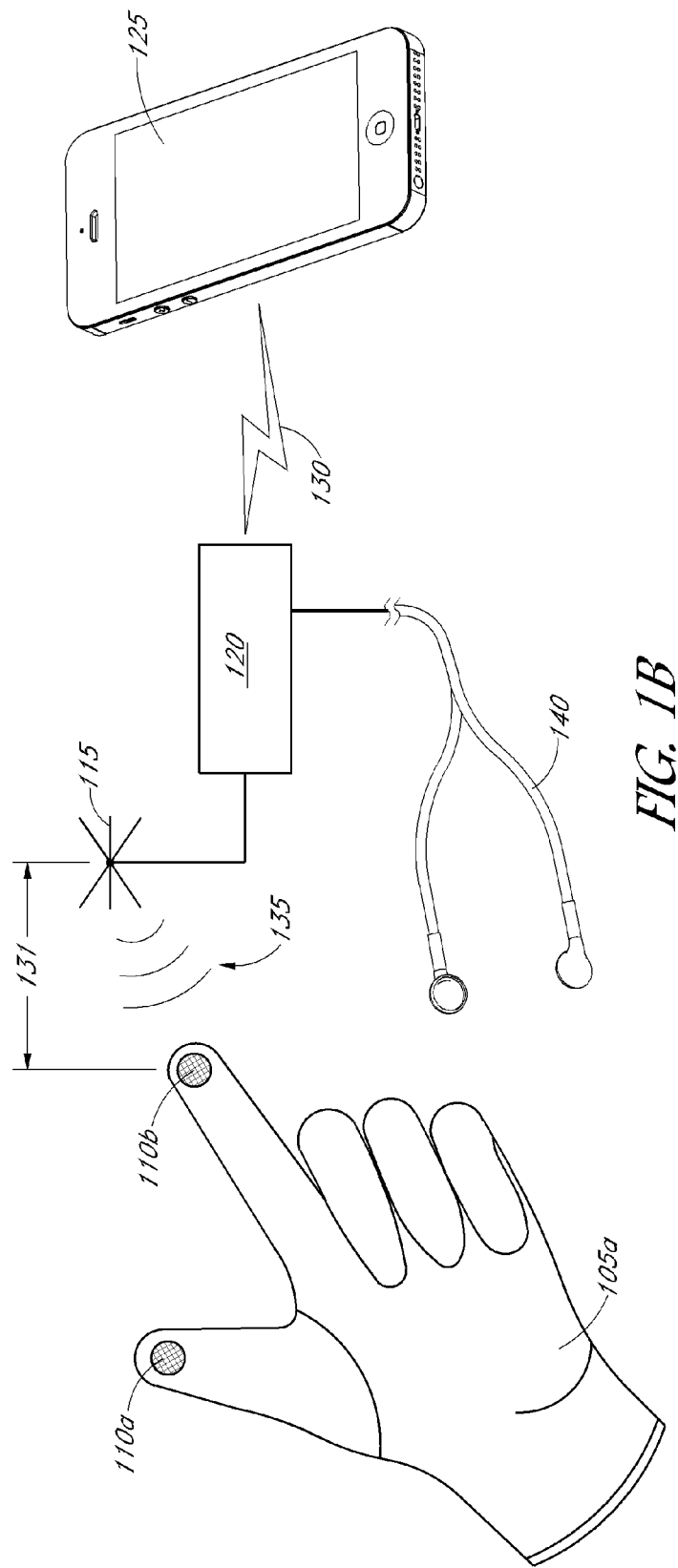
FIG. 1B depicts an exemplary diagram of the system of FIG. 1A wherein the RFID devices are disposed in a glove. The glove is used to control the electronic device via a base unit.

FIG. 1B depicts an exemplary diagram of the embodiment of the system of FIG. 1A with the glove 105 controlling an electronic device 125 via the base unit 120. A user listens to the data received from the electronic device 125 via the headphones, ear buds or other audio device 140 connected to the base unit 120. In FIG. 1B, the user has moved the RFID device 110b within the wireless field 135 established by the RFID reader antenna 115. The exemplary wireless field 135 may extend a distance 131 of up to one inch around the RFID reader antenna 115. In another embodiment, the RFID reader antenna 115 may be more or less powerful such that the wireless field 135 is larger or smaller than the wireless field 135 depicted herein.

A user may bring one or more of the RFID devices 110a-110f (e.g., RFID device 110b) into the wireless field 135 of the RFID reader antenna 115. When the RFID device 110b is within the wireless field 135 of the RFID reader antenna 115, the RFID device 110b may obtain power from the wireless field 135. The RFID device 110b may use the obtained power to transmit the information stored within the RFID device 110b to the RFID reader antenna 115.

The RFID reader antenna 115 may be connected to the base unit 120. Using its internal circuitry, the base unit 120 may output a command to the electronic device 125 based on the information received from the RFID device 110b. FIGS. 1A and 1B are not meant to be limiting as to the number of the RFID devices 110a-110f used in the RFID control system 100. One of skill in the art will understand that any number of RFID devices 110 may be used in the RFID control system 100.

The base unit 120 may comprise a power source, such as a battery, solar power, or an AC outlet. The base unit 120 is discussed in more detail below with reference to FIG. 3. In an embodiment, the base unit 120 may have a connector to which the RFID reader antenna 115 may connect. The base unit 120 may be used with various antennas. Such functionality may allow the user to not relocate the RFID reader antenna 115, and instead install multiple RFID reader antennas 115 for each application of the RFID control system.

In some embodiments, the RFID reader antenna 115 may be installed on or within the sleeve of a jacket (i.e., the sleeve of the ski jacket that may be used with the ski glove 105a of FIG. 1A). Another RFID reader antenna 115 may be installed in the helmet of the user's bike helmet, enabling the user to use the RFID control system 100 when participating in activities involving the bike helmet. In another embodiment, the RFID devices may be embedded in patches or similar items such that the RFID devices 110 may be used in a large number of activities and with multiple RFID reader antennas 115.

Figure 2:
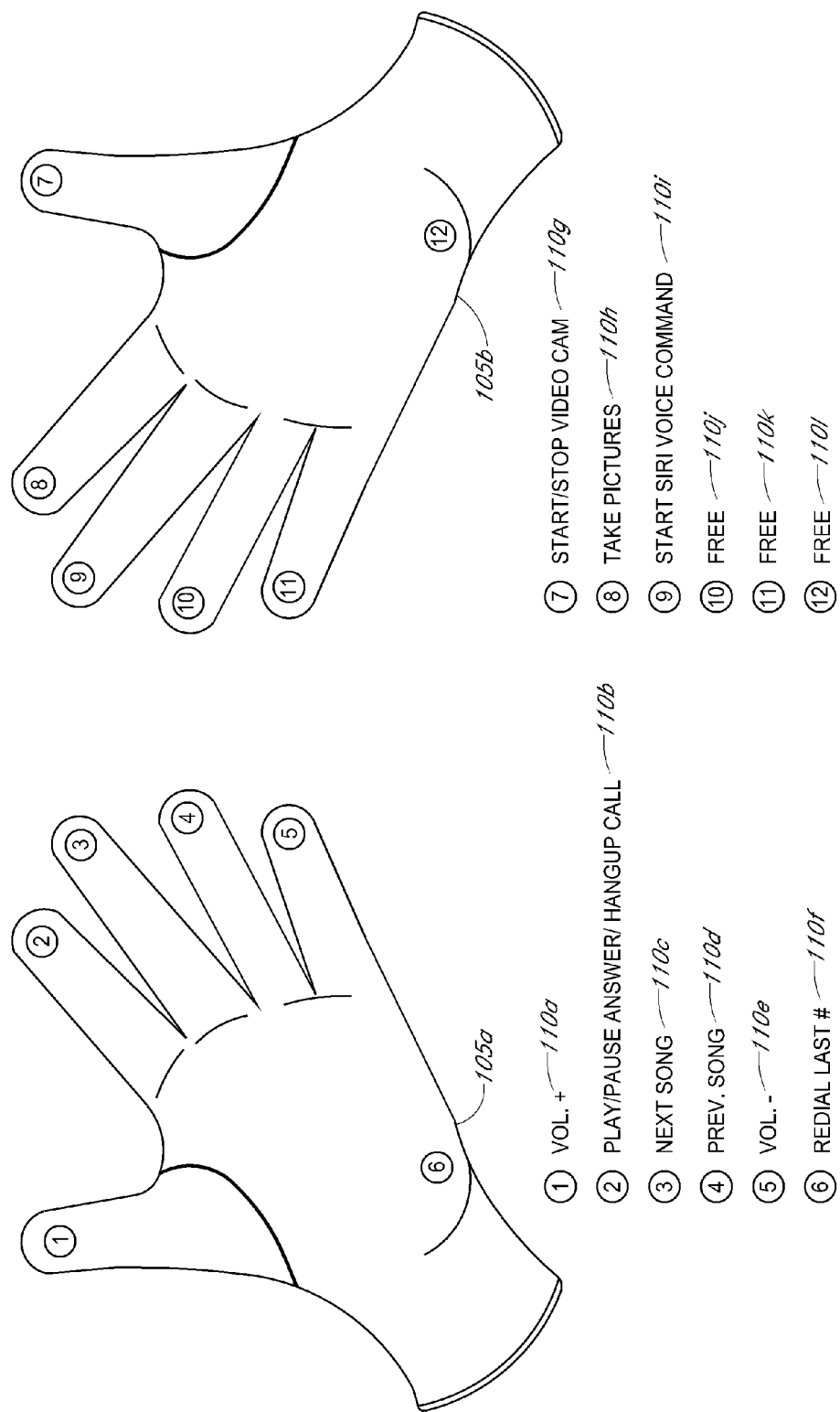
FIG. 2 is a plan view of the glove from FIG. 1B with a second glove that includes RFID devices. The RFID device somewhere on each finger from the pair of gloves is associated with a command for the electronic device.

FIG. 2 shows an illustration of an embodiment of the RFID devices 110 embedded in a pair of gloves 105a-105b. Each of the RFID devices 110a-110l is located in a fingertip or the base of the palm of one of the gloves. For example, the RFID device 110a is located at the tip of the thumb of the left glove 105a. The RFID devices 110b-110e are located at the tip of the pointer finger, middle finger, ring finger, and pinkie finger of the left glove 105a, respectively. The RFID device 110f is embedded in the base of the palm of the glove 105a. Similarly, the RFID devices 110g-110k are embedded at the tip of the thumb, pointer finger, middle finger, ring finger, and pinkie finger of the right glove 105b, respectively. The RFID device 110l is embedded in the base of the palm of the glove 105b. Each of these RFID devices 110a-110l has a unique identifier that will be broadcast when brought within range of the wireless field 135 of the RFID reader antenna 115.

Figure 3:
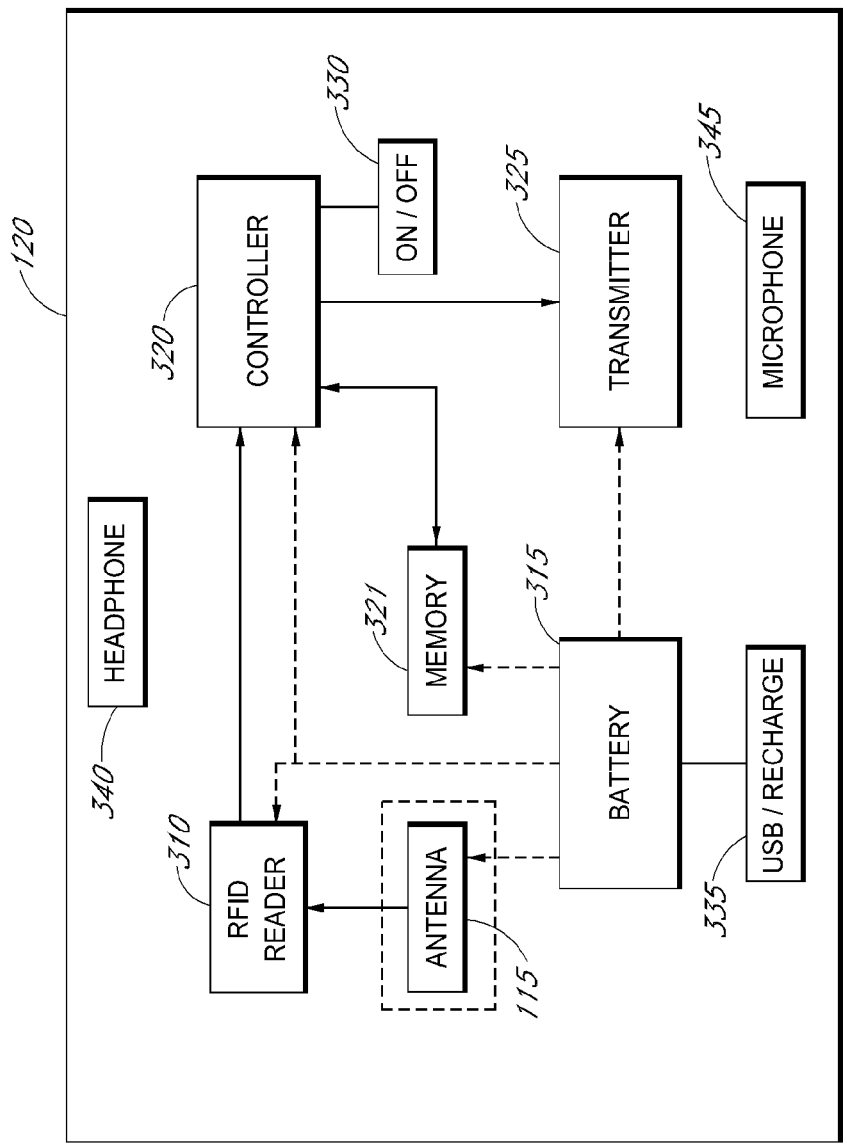
FIG. 3 shows a schematic diagram of the base unit from FIG. 1B employing a wireless technology.

FIG. 3 shows a schematic diagram of the base unit 120 for the RFID control system 100. The base unit 120 may comprise an RFID reader 310 which may be connected to the RFID reader antenna 115. The RFID reader antenna 115 may be mounted internal to the base unit 120, external to the base unit 120, or remote from the base unit 120 and connected to the base unit 120. The RFID reader 310 may also connect to the controller 320. The controller 320 may be connected to a memory 321 and a transmitter 325.

The base unit 120 may further include an on/off switch 330, power recharge connection 335, headphone connection 340, and microphone connection 345. All of the components within the base unit 120 may be connected to a battery 315 or other power source.

The RFID reader 310 may function to receive information from the RFID reader antenna 115 and convert the received information into a usable format for the controller 320. The controller 320 may receive the information from the RFID reader 310 corresponding to information received from the RFID device 110. The controller 320 may then determine the command associated with the information received to transmit to the electronic device 125 by referencing the memory 321, and provide the associated command to the transmitter 325 for communication to the electronic device 125. In an alternate embodiment, the RFID reader 310 may determine the command associated with a particular RFID device 110 by using the memory 321 and provide only the associated command to the controller 320, which the controller 320 may provide to the transmitter 325 for communication to the electronic device 125. In another embodiment, the RFID reader 310 may receive other information from the RFID device 110. The RFID reader 310 and/or the controller 320 may determine a command associated with the received information to provide to the transmitter 325 or may provide the received information directly to the transmitter 325. The memory 321 may be used to store the associations between unique identifiers of the RFID devices 110a-110f and the commands to the electronic device 125. The battery 315 may provide the power to operate the circuitry of the base unit 120 and to create the wireless field 135 transmitted by the RFID reader antenna 115.

Figure 4:
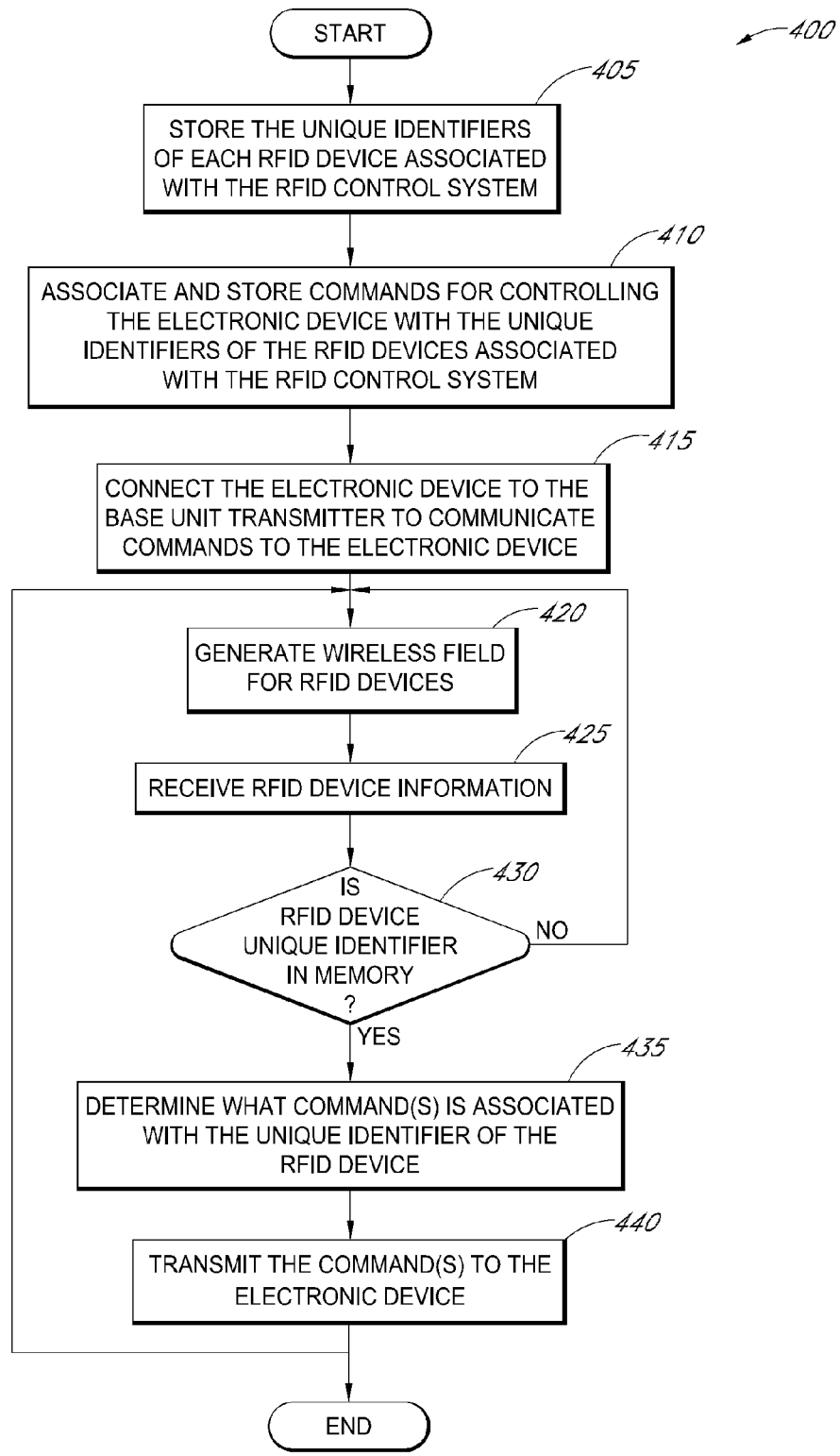
FIG. 4 depicts a flowchart of an exemplary method for controlling an electronic device.

FIG. 4 depicts a flowchart of an exemplary embodiment of the method of controlling an electronic device 125. Process 400 may be performed, in some aspects, by the base unit 120 of FIG. 3, to control an electronic device 125, such as a smart phone or music player using RFID devices 110.

The process 400 may begin with Step 405. Step 405 comprises storing the unique identifiers of the RFID devices (i.e., RFID devices 110a-110f as referenced in FIGS. 1A & 1B) being used by the RFID control system 100 in memory 321 of FIG. 3. The unique identifiers associated with the RFID devices 110a-110f may be stored to enable the RFID control system 100 to detect and recognize the RFID devices 110a-110f associated with the RFID control system 100. Thus, RFID devices 110 not associated with the RFID control system 100 may be ignored. Storing the unique identifiers may allow the association of commands for the electronic device 125 with the unique identifiers. The process 400 continues with Step 410, where commands for the electronic device 125 are associated and stored with the stored unique identifiers of the RFID devices 110a-110f in memory 321. This step may allow the base unit 120 to send the proper command to the electronic device 125 when a specific RFID device 110 (such as RFID device 110a) is placed within the wireless field 135. The association between stored unique identifiers and commands for the electronic device 125 may ensure that the user may select a predetermined response when a specific RFID device 110a is within the wireless field 135. At step 415 the electronic device 125 is connected or linked to the base unit 120 such that the commands associated with the RFID devices 110a-110f may be communicated to the electronic device 125 via the communication path 130. This connection may be a physical connection or a wireless pairing such that communication between the two devices may take place. In another embodiment, any of steps 405, 410, and 415 may be combined.

At step 420 the base unit 120 generates the wireless field 135 using the RFID reader antenna 115 of FIG. 3. In this step, the RFID reader antenna 115 may use power from the battery 315 of the base unit 120 to create the wireless field 135 around the RFID reader antenna 115. This wireless field 135 will provide power for passive RFID devices 110a-110f so that any RFID device 110 within the wireless field 135 may receive power necessary to transmit its stored information to the RFID reader antenna 115. In step 425, the base unit 120 may receive the information from the RFID device 110 (i.e., RFID device 110a). The RFID reader 310 receives the information from the RFID device 110a via the RFID reader antenna 115. The RFID reader 310 decodes the received information and communicates it to the controller 320 within the base unit 120. If the information received from the RFID device 110a is a unique identifier, the base unit 120 may proceed to step 430 and determine if the unique identifier is stored in the memory 321 and associated with a command for the electronic device 125. The controller 320 may compare the unique identifier received from the RFID reader 310 with the unique identifiers stored in the memory 321 and determine if there is a command associated with the unique identifier. If the unique identifier is not stored in the memory 321 and/or not associated with a command for the electronic device 125, then the base unit 120 can ignore the information received and return to only generating the wireless field 135 at step 420. If the base unit 120 determines at step 430 that the unique identifier is stored in the memory 321 and is associated with a command, the process 400 may move to step 435. In an embodiment, if the information received from the RFID device 110 is a command for the electronic device 125, the controller sends the command to the transmitter 330 to communicate it to the electronic device 125 via the communication path 130. In step 435, the base unit 120 may determine what command is associated with the unique identifier of the RFID device 110a. This may be accomplished by checking the associations created in step 410 between the commands controlling the electronic device 125 and the unique identifiers of the RFID devices 110a-110f. In an alternate embodiment, each unique identifier may be associated with more than one command to the electronic device 125. Then, process 400 may progress to step 440, where the command associated with the RFID device 110a is transmitted to the electronic device 125. This step may entail the controller 320 communicating the command or commands associated with the unique identifier of the detected RFID device 110 to the transmitter 325. The transmitter 325 may then transmit the commands to the electronic device 125. As explained above, in response the electronic device 125 can send, stop, start, etc. the data it sends to the base unit 120, such as desired music, via the communication path 130. The user may connect headphones, ear buds or other audio device 140 to the base unit 120 to hear the desired music. In certain embodiments, the user connects the headphones, ear buds or other audio device 140 to the electronic device 125. In such an embodiment, the base unit 120 controls the electronic device 125 but need not receive the data desired by the user. The user receives the data directly from the electronic device 125. Then, the process 400 may terminate.

FIG. 5 is a chart showing exemplary unique RFID tag identifiers and associated commands and tag locations. The chart of FIG. 5 is exemplary of the associations the controller 320 may create in the memory 321 between the unique identifiers of the RFID devices 110a-110f and the commands controlling the electronic device 125. The memory 321 may contain associations for the unique identifier of each RFID device 110a-110f associated with the RFID control system 100. Each unique identifier may be associated with one or more commands controlling the electronic device 125. One unique identifier may be associated with multiple commands to the electronic device 125. Thus, Unique Identifier 1, for example, of FIG. 5, may be associated with both the "Start" command and also an "Ignore Call" command for a cell phone that may be used as a music player. Thus, a user receiving a call may, with one motion, ignore the call and start the music playing again.

The number of associations between the RFID device 110 unique identifiers and commands of the electronic device 125 may only be limited by the size of the memory 321. One base unit 120 may be capable of operating with dozens of RFID devices 110, to control various electronic devices 125. In such an embodiment, FIG. 5 may indicate a chart with dozens or hundreds of unique identifiers for RFID devices 110. Similarly, the base unit 120 may be capable of storing commands to various electronic devices. The base unit 120 memory 321 may contain a chart of FIG. 5 with a third element of the association being the electronic device 125 being controlled. In such an embodiment, the unique identifier 1 of RFID device 110*a* in glove 105*a* may be associated with a command of "Start" when controlling a music player and a command of "Answer Call" when controlling a cellular phone. In the embodiment, the base unit 120 may detect what electronic device 125 it is connecting to and thus only look at associations with unique identifiers of RFID devices that are associated with commands for that electronic device 125. Additionally, in another embodiment, the RFID devices 110*a*-110*f* may be used with multiple base units 120 to control multiple electronic devices 125. In some other embodiments, an electronic device 125 may be used with multiple base units 120.

Figure 6:
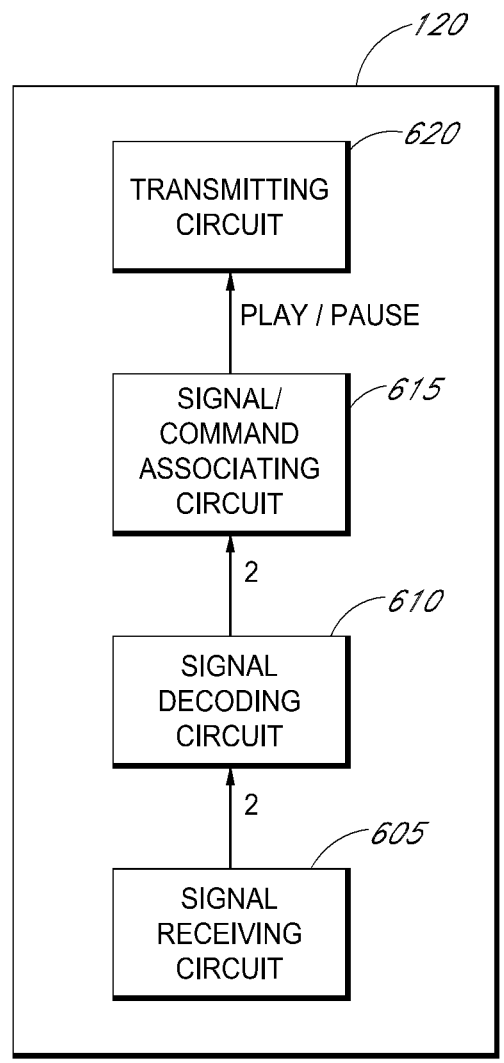
FIG. 6 illustrates a functional block diagram of an embodiment of the base unit from FIG. 1B.

FIG. 6 illustrates a function block diagram of an embodiment of the base unit 120 utilized in the RFID control system. The base unit 120 may comprise a field generating and signal receiving circuit 605, a signal decoding circuit 610, a signal/command associating circuit 615, and a transmitting circuit 620. The field generating and signal receiving circuit 605 may be configured to perform one or more of the functions discussed above with respect to the blocks 420 and 425 in FIG. 4. The field generating and signal receiving circuit 605 may correspond to one or more of the controller 320, the RFID reader 310, or the RFID reader antenna 115 in FIG. 3. The signal decoding circuit 610 may be configured to perform one or more of the functions discussed above with respect to blocks 425 and 430 in FIG. 4. The signal decoding circuit 610 may correspond to one or more of the controller 320 or the RFID reader 310 in FIG. 3. The signal/command associating circuit 615 may be configured to perform one or more of the functions discussed above with respect to blocks 405, 410, 425, 430, and 435 in FIG. 4. The signal/command associating circuit 615 may correspond to one or more of the controller 320 or the RFID reader 310 in FIG. 3. The transmitting circuit 620 may be configured to perform one or more of the functions discussed above with respect to block 440 in FIG. 4. The transmitting circuit 620 may correspond to the controller 320 or the transmitter 325 in FIG. 3.

Figure 7:
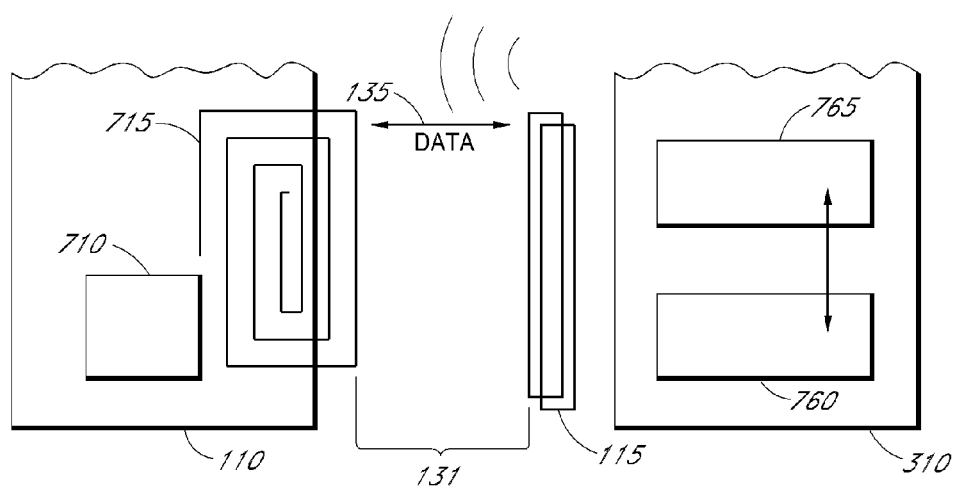
FIG. 7 schematically illustrates an exemplary RFID tag and RFID tag reader.

FIG. 7 schematically illustrates an exemplary RFID tag and RFID tag reader. Various RFID devices may be particularly suitable for use with the present invention illustrated and described herein. For example, in an embodiment, a 134.2 kHz/123.2 kHz, 23 mm glass transponder is preferably selected, such as available from Texas Instruments, Inc. (http://www.tiris.com, e.g., Product No. M-TRP-WRHP). In FIG. 7, an RFID device 110 may comprise a passive (batteryless) RF transmitter/receiver chip 710 and an antenna 715. The antenna 715 can be spiral wound. The RFID device 110 may be disposed within an enclosure. If desired, the RFID device 110 may be modified to provide an optional external antenna.

A wide variety of RFID tags are available in the form of a printed circuit on a thin, flat substrate. For example, the 13.56 MHz RFID tag sold under the brand name Tag-It™ and available from Texas Instruments, Inc. (http://www.tiris.com, Product No. RI-I03-110A). Paper thin and batteryless, this general purpose RFID device may fit between layers of laminated paper, plastic, or cloth to create inexpensive buttons, labels, patches, or badges. Tag-It™ inlays have a useful read/write range of about 25 cm and contain 256 bits of on-board memory arranged in 8×32-bit blocks which may be programmed (written) and read by a suitably configured read/write device. Such RFID devices are useful for storing and retrieving desired application information such as unique identifier, RFID device location, associated commands, associated devices, etc.

The transmitter/receiver chip 710 connects to the antenna 715. If desired, the RFID device 110 may be molded directly into a plastic, cloth, paper, or substrate of any material. In an embodiment, the RFID device 110 may be passive (requires no batteries) so that it is inexpensive to purchase and maintain. In another embodiment, the RFID device 110 may be active (containing a battery). In one embodiment, the tag is a 13.56 MHz tag sold under the brand name Tag-It™ available from Texas Instruments, Inc. (http://www.tiris.com, Product No. RI-I03-110A). The tag may be "read/write" or "read only", depending on its particular application. Optionally, more or less expensive chip tags may be used with equal efficacy.

The RFID devices 110 and the like are highly advantageous. They are inexpensive, disposable, and may be easily secured to or embedded within virtually any object, article of clothing, or the like, for electronically storing and retrieving desired user-specific or object-specific information. For example, FIG. 2 illustrates an embodiment of a pair of gloves 105*a*-105*b* having RFID devices 110*a*-110*l* secured therein for enabling the gloves 105*a*-105*b* to interact with various antennae located within an RFID-enabled environment.

The particular size, shape and theme of the RFID devices 110 are relatively unimportant. In the particular embodiment illustrated, the RFID devices 110 are shaped and sized so as to be embedded in other items. The RFID devices 110 may be packaged and sold together with a base unit containing the RFID reader 310 and other electronics necessary for the control of the electronic device, or they may be sold embedded into clothing or other objects.

In accordance with another preferred embodiment of the invention various RFID readers 310 are able to read the RFID devices 110 described herein and to actuate or control one or more electronic devices 125 in response thereto. For example, the unique identifier information can be conveniently read and provided to an associated base unit 120 for purposes of interacting with an associated electronic device 125.

FIG. 7 also depicts a simplified schematic diagram of one embodiment of an RFID reader 310 for use with the shown RFID devices 110*a*-110*l*. A preferred RFID reader 310 is the Series 2000 Micro Reader available from Texas Instruments, Inc. (http://www.tiris.com, e.g., Product No. RI-STU-MRD1). In certain embodiments, the RFID reader 310 comprises an RF module 765, a control unit 760 and an RFID reader antenna 115. When the RFID device 110 embedded in the gloves 105*a*-105*b* or other object comes within a predetermined range of RFID reader antenna 115 (about 1 inch) the RFID device antenna 715 is excited by the radiated wireless field 135 and momentarily creates a corresponding voltage signal which powers the transmitter/receiver chip 710. In turn, the transmitter/receiver chip 710 outputs an electrical signal response which causes the RFID device antenna 715 to broadcast certain information stored within the RFID device 110. This information may include a unique identifier.

A carrier signal embodying this information is received by the RFID reader antenna 115. The RF module 765 decodes the received signal and provides the decoded information to the control unit 760. The control unit 760 processes the information and provides it to an associated logic controller, PID controller, computer or the like using a variety of standard electrical interfaces. For example, the processed information could be provided to the controller 320 of the base unit 120. Thus, the information transmitted by RFID device 110 and received by the RFID reader 310 may be used to control one or more electronic devices 125, for example.

In some embodiments, the RFID reader 310 may also be configured to broadcast or "write" certain information back to the RFID device 110 to change or update information stored in its internal memory, for example. The exchange of communications occurs very rapidly (about 70 ms) and so, from the user's perspective, it appears to be virtually instantaneous. Thus, the RFID devices 110 embedded into the gloves 105a-105b or similar device may be used to communicate with various associated electronic devices by simply touching or bringing the RFID device 110 into relatively close proximity with the RFID reader antenna 115 of the RFID reader 310.

As indicated above, communication of data between an RFID device 110 and an RFID reader 310 is by wireless communication. As a result, transmitting such data is always subject to the vagaries and influences of the media or channels through which the data has to pass, including the air interface. Noise, interference and distortion are the primary sources of data corruption that may arise. Thus, those skilled in the art will recognize that a certain degree of care should be taken in the placement and orientation of RFID readers 310 so as to minimize the probability of such data transmission errors.

Those skilled in the art will readily appreciate from the disclosure herein that the invention is not limited to the specific RFID devices 110 or RFID readers 310 disclosed herein, but may be implemented using any one or more of a wide variety of commercially available RFID devices 110 or RFID readers 310 such as are known or will be obvious from the disclosure herein to those skilled in the art.

Typical RFID data communication is asynchronous or unsynchronized in nature and, thus, particular attention should be given in considering the form in which the data is to be communicated. Structuring the bit stream to accommodate these needs, such as via a channel encoding scheme, is preferred in order to provide reliable system performance. Various suitable channel encoding schemes, such as amplitude shift keying (ASK), frequency shift keying (FSK), phase shift keying (PSK) and spread spectrum modulation (SSM), are well known to those skilled in the art and will not be further discussed herein. The choice of carrier wave frequency is also important in determining data transfer rates. Generally speaking the higher the frequency the higher the data transfer or throughput rates that can be achieved. This is intimately linked to bandwidth or range available within the frequency spectrum for the communication process. Preferably, the channel bandwidth is selected to be at least twice the bit rate required for the particular game application.

The read or write cycle begins with a charge (or powering phase). During this phase, the RF Module 765 causes the RFID reader antenna 115 to emit the wireless field 135 at a frequency of about 134.2 kHz. In another embodiment, the frequency of the wireless field may be higher or lower than 134.2 kHz.

The charge phase is followed directly by the read phase (read mode). Thus, the RFID device 110 begins transmitting its data and utilizing the energy received from the wireless field. The RFID device 110 response duration may be less than about 20 ms. In another embodiment, the RFID device 110 response duration may be less than or greater than 20 ms.

The signal embodying the transmitted information is received by RFID reader antenna 115 and is decoded by RF module 765. RF Module 765 has the primary function and capability to charge up the RFID device 110, to receive the RFID device 110 signal and to demodulate it for further processing. The control unit 760 may operate as an interface for a PC, logic controller or PLC controller for handling display and command input/output functions, for example, the controller 320 of the base unit 120.

Figure 8B:
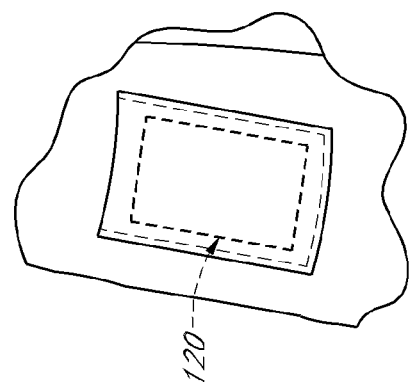
FIG. 8B is similar to FIG. 8A except that the control unit is located in a movable patch in the jacket.
Figure 8A:
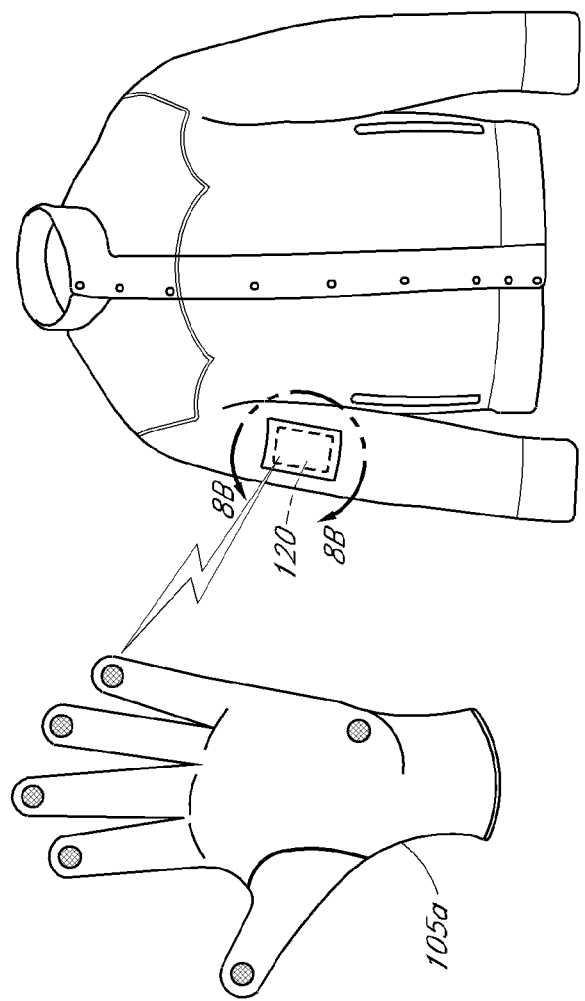
FIG. 8A depicts an illustration of an embodiment of the system where the control unit is embedded in a jacket in combination with the glove from FIG. 1A.
Figure 8C:
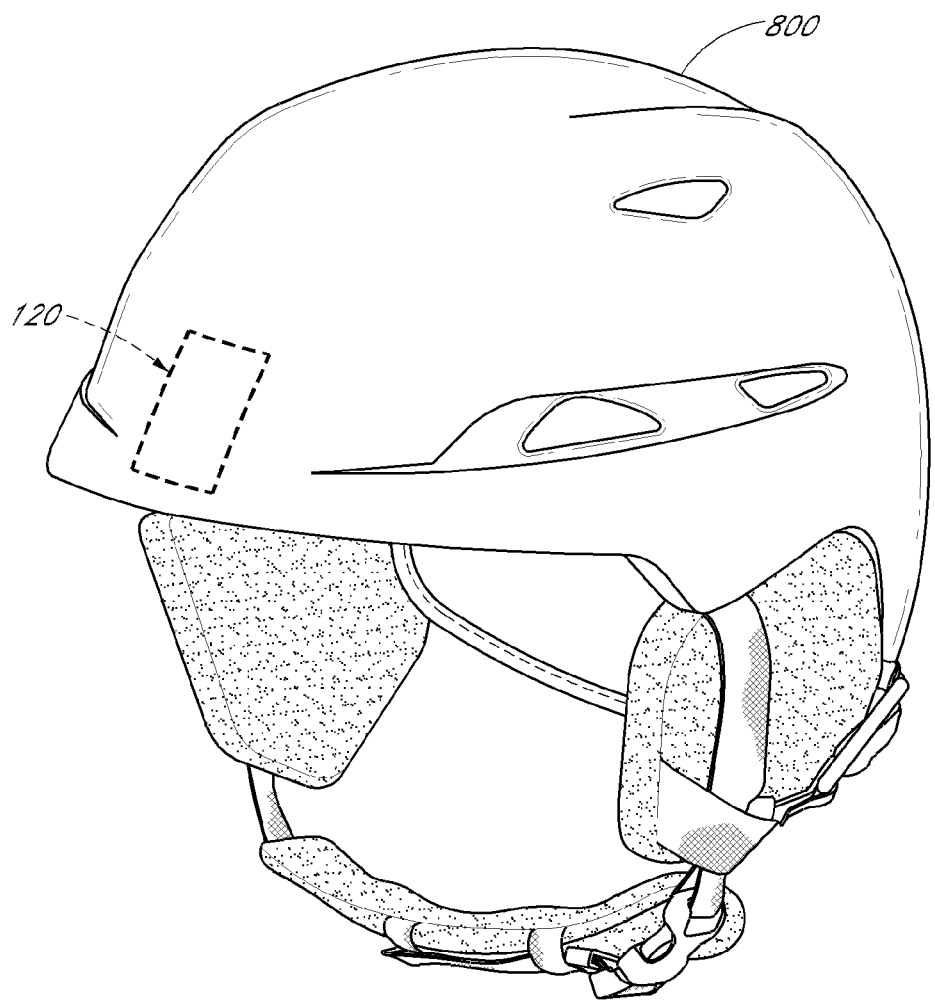
FIG. 8C depicts an illustration of an embodiment where the control unit is disposed in a ski, motorcycle, or cycling helmet.
Figure 9A:
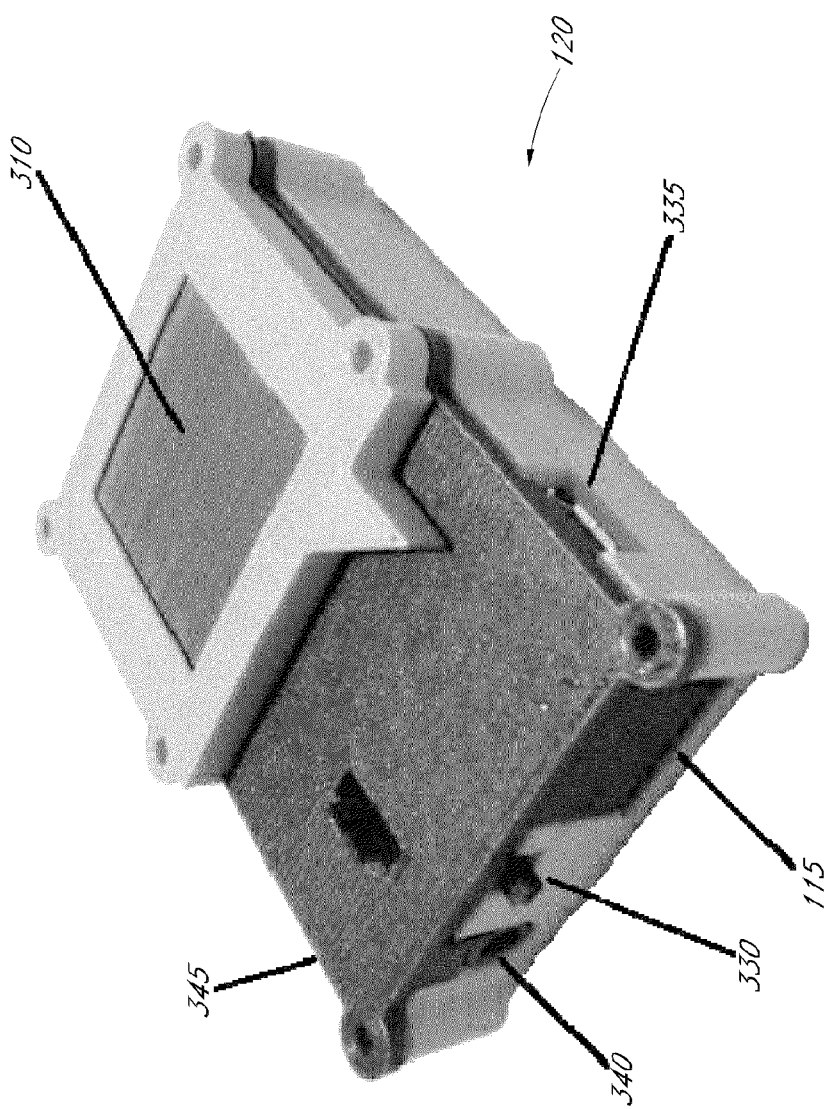
FIG. 9A is a photo of an embodiment of the control unit from FIG. 1A.
Figure 9B:
FIG. 9B is a photo of an embodiment of the glove from FIG. 2 with the RFID devices removed from the glove.

FIG. 8A depicts an illustration of an embodiment of the system 100 where the control unit 120 is embedded in a jacket in combination with the glove 105 from FIG. 1A. FIG. 8B is similar to FIG. 8A except that the control unit 120 is located in a movable patch in the jacket. The control unit 120 and/or the RFID reader antenna 115 may be located in the same location or separated within the jacket. FIG. 8C depicts an illustration of an embodiment where the control unit 120 is disposed in a ski helmet 800. FIG. 9A is a photo of an embodiment of the control unit 120 from FIG. 1A. The embodiment of the base unit 120 depicted in the photo shows one arrangement of the RFID reader antenna 115, the RFID reader 310, the on/off switch 330, the power recharge connection 335, the headphone connection 340, and the microphone connection 345 on various sides of the base unit 120. Of course the base unit 120 includes internal components as described in connection with FIG. 3 that are not visible in FIG. 9A. FIG. 9B is a photo of an embodiment of the glove 105b from FIG. 2 with the RFID devices 110 removed from the glove 105b.

Figure 10:
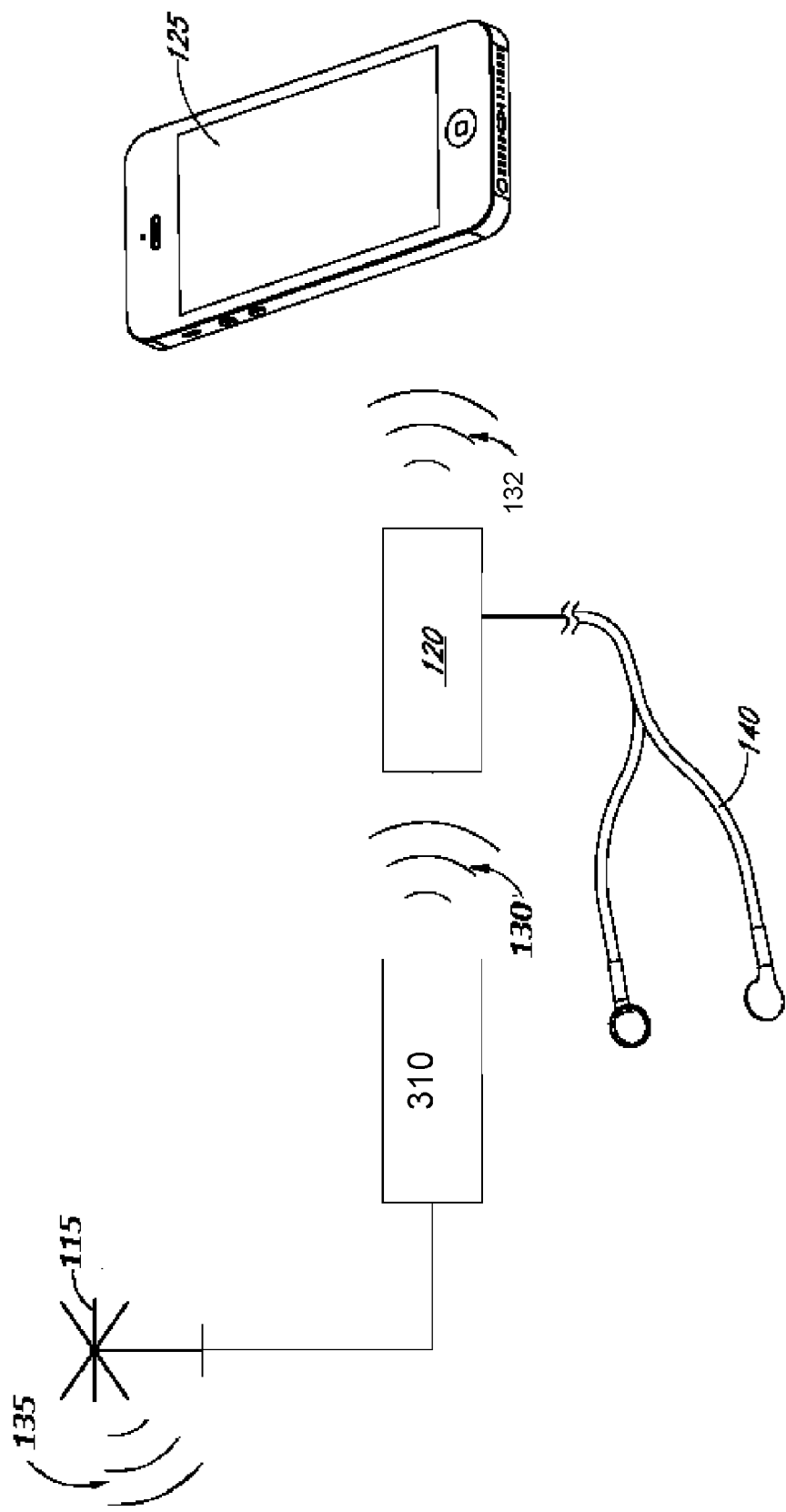
FIG. 10 depicts an exemplary diagram of an embodiment of a system for simplifying electronic device control using RFID devices wirelessly coupled to the electronic device being controlled.

FIG. 10 depicts an exemplary diagram of an embodiment of a system for simplifying electronic device control using RFID devices wirelessly coupled to the electronic device being controlled. As shown in FIG. 10, RFID reader antenna 115 may be electrically connected to RFID reader 310. The RFID reader 310 may wirelessly couple with base unit 120, to which audio device 140 may be connected. The base unit 120 and audio device 140 may be wirelessly coupled to electronic device 125, which, as described above, may be configured to play music or provide other information to the user.

The RFID reader antenna 115 may comprise the same functionality and components described above in reference to FIGS. 1A, 1B, and 3. The RFID reader 310 may comprise components necessary to perform the functionality of sending the unique identifier(s) (or other information) received from the RFID devices 110 via the RFID reader antenna 115 to the base unit 120. The base unit 120 may comprise many of the same components as described above, with the exception of the RFID reader 310. In some embodiments, the components within the RFID reader 310 may comprise one or more of a transmitter/receiver, a power supply/source, a memory, and a processor. In some embodiments, the RFID reader 310 may receive the unique identifiers from the RFID reader antenna 115 that are associated with RFID devices 110 within the range of the RFID reader antenna 115 (i.e., within wireless field 135) and may communicate the received unique identifiers to the base unit 120. In some embodiments, the association of unique identifiers received from the RFID devices 110 with associated commands may be performed at the RFID reader 310, and the command itself may be communicated to the base unit 120 for communication to the electronic device 125. In some embodiments, the unique identifier from the RFID devices 110 may be communicated to the base unit 120 from the RFID reader 310, and the base unit 120 may associate the unique identifiers with an associated command.

In some embodiments, the RFID reader 310 may be configured to receive information and/or signals from the base unit 120 acting as a relay between the electronic device 125 and the RFID reader 310. For example, in some embodiments, the audio device 140 may be configured to be electrically connected to the RFID reader 310. The RFID reader 310 may be configured to receive music being played on the music player 125 and convey the music to the user via the audio device 140 electrically connected to the RFID reader 310.

The base unit 120 may be wirelessly coupled to the electronic device 125 as described above. The communication path 130 may provide bi-directional communications between the base unit 120 and the electronic device 125. The commands associated with the RFID devices may be communicated from the RFID reader antenna 115 to the RFID reader 310, from the RFID reader 310 to the base unit 120 via communication path 133, and from the base unit 120 to the electronic device 125 via the communication path 130. Similarly, the media or data from the electronic device 125 may be communicated to the base unit 120 via communication path 130 and further to the RFID reader 310 via communication path 133.

In some embodiments, separating the RFID reader 310 from the base unit 120 may provide the user with additional flexibility in the positioning or locating of the RFID reader 310 and the RFID reader antenna 115 than when the RFID reader 310 is integrated into the same unit as the base unit 120. The RFID reader 310 may be smaller than the base unit 120 due to the RFID reader 310 comprising fewer components than the base unit 120, and thus may be placed in more restricted (i.e., smaller) locations. Additionally, separating the RFID reader 310 from the base unit 120 may provide flexibility of placing the RFID reader antenna 115 and RFID reader 310 in more convenient locations than if the RFID reader antenna 115 is physically connected to the base unit 120 and all the circuitry contained therein. For example, the RFID reader antenna 115 may be placed on the handlebar of a bicycle with only the RFID reader 310 electrically attached. As the RFID reader 310 may be smaller than the base unit 120, the RFID reader 310 may be more safely secured on the bicycle without impeding the user's use of the bicycle. The wirelessly coupled base unit 120 and electronic device 125 may be safely stored in a backpack or pocket of the user where they are safer and need not be physically accessed.

Additionally, the smaller size of the RFID reader 310 may keep the RFID reader 310 less susceptible to physical impact or shock that may adversely impact the RFID reader 310, for example, causing it to become loose from its mounting or damaging the internal electronics due to the shock. Separating the RFID reader 310 from the base unit 120 may allow the user to use multiple RFID reader 310 and RFID reader antenna 115 devices, as these devices may have lower costs than RFID readers and antennas 310 and 115, respectively, integrated into base units 120. This may allow the user to acquire multiple RFID reader antenna 115 and reader 310 devices and not have to move them between activities or installations (i.e., the user may leave an RFID reader antenna 115 and RFID reader 310 installed on the bike and have another pair installed in a ski jacket).

The wireless communications between the RFID reader 310 and the base unit 120 (i.e., communication path 130) and the base unit 120 and the electronic device 125 (i.e., communication path 133) may be any format of wireless communications, for example low-power Bluetooth, Wi-Fi, cellular, infrared, etc.

Figure 11:
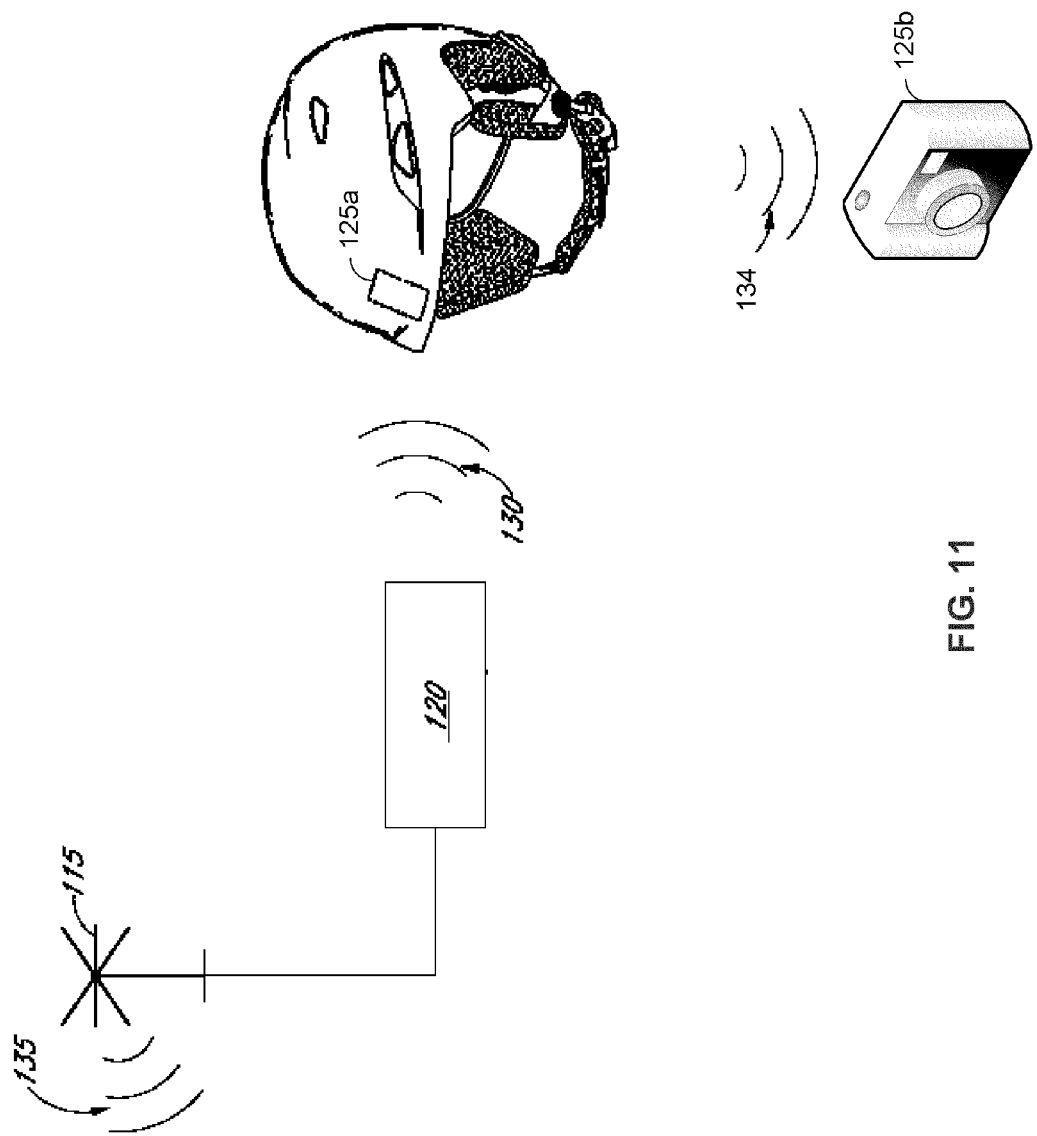
FIG. 11 depicts an exemplary diagram of a system for simplifying electronic device control via a remote system capable of operating apps (or programs or software) configured to control the electronic device.

FIG. 11 depicts an exemplary diagram of a system for simplifying electronic device control via a remote system capable of operating apps 126 (or programs or software) configured to control the electronic device. As shown in FIG. 11, the RFID reader antenna 115 may be electrically connected directly to the base unit 120, which may comprise the RFID reader 310 and other components depicted in FIG. 3. In some embodiments, the base unit 120 may be configured to communicate with a first electronic device 125a (e.g., a computer). In some embodiments, the first electronic device 125a may be configured to run/execute an app or run a program 126. In some embodiments, the first electronic device 125a may comprise communication hardware configured to receive a communication from an external device (e.g., a second electronic device 125b) and convert the received communication into information for use by apps operating on the first electronic device 125a. In some embodiments, the same communication hardware may be further configured to convert information from apps operating on the first electronic device 125a to a communication and transmit the communication to an external device, e.g., the second electronic device 125b. In some embodiments, the first electronic device 125a may comprise any mobile computing device, such as a cell phone or a wearable computing device (e.g., Google Glass™).

The first electronic device 125a and the app 126 running thereon may be configured to communicate with the second electronic device 125b via communication hardware of the first electronic device 125a. Both the communications between the base unit 120 and the first electronic device 125a and the first electronic device 125a and the second electronic device 125b may be wireless via communication paths 130 and 134, respectively. As will be described in further detail below, both communication paths 130 and 134 may be bidirectional such that commands and/or information may be passed in both directions.

As described above, the base unit 120 may be configured to receive one or more unique identifiers (or data or information) from RFID devices 110 via the RFID reader antenna 115. The received unique identifiers may be associated with specific commands. In some embodiments, the base unit 120 may communicate either the unique identifiers or the associated specific commands to the first electronic device 125a via communication path 130. When communicating the unique identifiers, the first electronic device 125a may receive unique identifiers and associate them with specific commands. In some embodiments, the first electronic device 125a may receive unique identifiers, but the app 126 may associate them with specific commands.

Accordingly, one of the RFID devices 110a may be associated with a variety of commands via the use of the app, which may be dependent upon the second electronic device 125b being controlled by the app. For example, the unique identifier for RFID device 110a may be communicated to the first electronic device 125a. If the first electronic device 125a is running a music player control app, then the app 126 may associate the RFID device 110a with a command to stop playing music, which the first electronic device 125a may communicate to the second electronic device 125*b* (that is a music player). Similarly, if the first electronic device 125*a* is running a camera control app, then the app 126 may associate the RFID device 110*a* with a command to capture a picture, which the first electronic device 125*a* may communicate to the second electronic device 125*b* (that is a camera).

When communicating the associated specific commands to the first electronic device 125*a* via communication path 130, the first electronic device 125*a* may receive the associated specific commands. The app 126 operating on the first electronic device 125*a* may associate the received commands to commands associated with the type of device being controlled by the app, before broadcasting any commands to the second electronic device 125*b*. In some embodiments, the app 126 may be configured to provide one or more shortcuts or sequences or macros of steps or commands. For example, the app 126 may be configured to receive a command from RFID device 110*a* to capture a picture on a second electronic device 125*b* that is a camera. However, to capture a picture on the camera, more than one step may be required (e.g., a first button may be pressed to focus the camera, and then a second button may be pressed to capture the focused picture). Accordingly, the app 126 may be configured to generate a two command shortcut (or two command sequence) associated with a single RFID device 110*a* command. In some embodiments, the command shortcuts may comprise more than two commands. Thus, when the RFID device 110*a* command is presented to the app 126, the app 126 may be configured to send one or more commands to the camera 125*b* to capture the picture, here the first command to focus the camera and the second command to capture the focused picture.

In some embodiments, a single app 126 may be configured to receive commands from RFID devices 110 and generate commands to control more than one second electronic device 125*b*. For example, the single app 126 may be configured to control a music player, a camera, a cell phone, and a health monitor, to name a few. The user may select which one of these devices the single app 126 may control, for example, via a drop down menu or a selection box. The single app 126 may also be configured to generate one or more commands to control the second electronic devices 125*b*. For example, as described above, commanding one of the second electronic devices 125*b* to perform a task may require more than one command (for example, the focusing and capturing commands to a camera). The single app 126 may be configured to generate sequences, macros, or combinations of commands as necessary to command one of the second electronic devices 125*b* to perform a task based on a received RFID device 110*a* command.

In operation, the app 126 may receive the specific command or unique identifier from communication hardware of the first electronic device 125*a*. In some embodiments, the same communication hardware may be used to communicate the commands to the second electronic device 125*b*. In some embodiments, separate communication hardware in the first electronic device 125*a* may be used for communications to/from the base unit 120 and to/from the second electronic device 125*b*.

In some embodiments, the communication between the first electronic device 125*a* and the second electronic device 125*b* via communication path 134 may be bidirectional, and the app 126 operating on the first electronic device 125*a* may request information or data from the second electronic device 125*b*. For example, the specific command received may be interpreted by the app 126 as a command to start playing music on the second electronic device 125*b*, which may be a music player. Accordingly, the app 126 operating on the electronic device 125*a* may communicate the command to start playing music via communication path 134 to the music player 125*b*. Then, the music player 125*b* may communicate the music being played to the first electronic device 125*a* via the communication path 134, and the music being played may be conveyed to the user via audio device 140.

FIG. 12 depicts an exemplary diagram of an embodiment of a system for simplifying electronic device control using RFID devices wirelessly coupled to the electronic device being controlled. As shown in FIG. 12, the RFID antenna 115 is electrically connected to the RFID reader 310. The RFID reader 310 is wirelessly coupled to a first electronic device 125*a*, which may be further coupled to one or more second electronic devices 125*b*. In some embodiments, the first electronic device 125*a* may be electrically connected to the audio device 140. In some embodiments, the base unit 120 may be a separate device integrated into the first electronic device 125*a*. In some embodiments, the first electronic device 125*a* may comprise similar components to those found in the base unit 120 but not forming a base unit 120 within the first electronic device 125*a*, and the functionality of the base unit 120 may be performed by an app 126 operating on the first electronic device 125*a*. The first electronic device 125*a* may comprise components configured to allow wireless transmitting and receiving of commands and data to and from second electronic devices 125*b*.

The first electronic device 125*a* may be configured to receive unique identifiers from the RFID reader 310 via the base unit 120 (or similar components) integrated within the first electronic device 125*a*. The base unit 120 may be configured to receive the wireless communications (comprising the unique identifiers) from the RFID reader 310 and associate the unique identifiers with commands. These associated commands may then be presented from the base unit 120 to the first electronic device 125*a* for use by the apps. The apps on the electronic device 125*a* may be configured to control the one or more second electronic devices 125*b* based on the commands from the base unit 120. In some embodiments, the apps on the electronic device 125*a* may receive a command from the base unit 120 associated with an RFID device 110 and use that command to control the one or more second electronic devices 125*b*.

Such integration of the base unit 120 and the first electronic device 125*a* may provide for expanded capabilities of the RFID control system. For example, the same RFID devices 110 may now be used to control a variety of second electronic devices by selecting different apps on the first electronic device, where the commands associated with each of the RFID devices 110 are "converted" into commands to the one or more second electronic devices 125*b*.

For example, the thumb RFID device 110*a* (referenced in FIG. 1A) unique identifier (or other information) may be received by the RFID reader antenna 115 and wirelessly communicated from the RFID reader 310 to the first electronic device 125*a*, which may be a cellular phone or other similar device (e.g., tablet, laptop, computer, etc.). The electronic device 125*a* or the app 126 may associate the unique identifier received from the RFID reader 310 with a command in the cell phone 125*a*. In some embodiments, each unique identifier may be associated with a single command in the cell phone 125*a*. Depending on the app 126 operating on the cell phone 125*a*, the one or more second electronic devices 125*b* may be controlled differently based on the single command in the cell phone 125*a*.

If the app 126 operating on the cell phone 125*a* is an app 126 to control a camera, then the app 126 may convert the command associated with the RFID device 110*a* in the cell phone 125*a* to a command to take a picture that is broadcast to the camera second electronic device 125*b*. However, when the app 126 operating on the cell phone 125*a* is an app 126 to control a music player, the app 126 may convert the same command associated with the RFID device 110*a* to a command to play music that is broadcast to the music player second electronic device 125*b*. Alternatively, when the app 126 operating on the cell phone 125*a* is an app 126 to control a health monitor, the app 126 may convert the same command associated with the RFID device 110*a* to a command to activate the health monitor electronic device 125*b*. Accordingly, the limited number of RFID devices 110 may be extended to a near infinite number of control commands limited only by the apps on the first electronic device 125.

In some embodiments, the wireless communications path 130 between the RFID reader 310 and the base unit 120 integrated into the first electronic device 125*a* and the wireless communications path 134 between the first electronic device 125*a* and the one or more second electronic devices 125*b* may comprise any wireless communication protocol, including, for example, Bluetooth, low power Bluetooth, RFID, Wi-Fi, near-field communications (NFC), infrared, etc. In some embodiments, one or more of the wireless communication paths 130 and 134 may be configured to be bidirectional, such that commands may be communicated from the first electronic device 125*a* to the one or more second electronic devices 125*b* and vice versa. For example, if the RFID device 110*a* is placed near the RFID reader antenna 115, the unique identifier may be communicated via communication path 130 from the RFID reader 310 to the base unit 120 in the first electronic device 125*a*, or cell phone 125*a*. An app 126 operating on the cell phone 125*a* may receive a command from the base unit 120 associated with the unique identifier from RFID device 110*a* and broadcast a command via wireless communication hardware of the cell phone 125*a* to one or more of the second electronic devices 125*b*, or music player 125*b*, via communication path 134. Music player 125*b* may begin playing music and may communicate the music wirelessly to the cell phone 125*a* via the communication path 134. The cell phone 125*a* may output the wirelessly received music via audio device 140 coupled thereto.

In some embodiments, the RFID reader antenna 115 and the RFID reader 310 may be combined into a single device. In addition to extending the control capabilities of a limited number of RFID devices 110, combining the base unit 120 with the first electronic device 125*a* may also reduce the number of components in the system and may allow the user to streamline his use of a system comprising of the combined RFID reader antenna 115 and reader 310 device, the first electronic device 125*a*, and the one or more second electronic devices 125*b*. Additionally, the RFID reader antenna 115 and reader 310 device may comprise lower cost components, and thus may allow the user to create a more versatile system by having multiple RFID reader antenna 115 and reader 310 devices placed in locations or in or on devices used for particular activities. For example, the user may install an RFID reader antenna 115 and reader 310 device on a bike, where the user may uses a video camera electronic device 125*b* controlled by the cell phone electronic device 125*a*. Additionally, the user may have another RFID reader antenna 115 and reader 310 device installed in a ski jacket, where the user may use a music player electronic device 125*b* controlled by the cell phone electronic device 125*a*. Accordingly, the user may be provided more control and flexibility in the use of the RFID control system.

Whereas particular embodiments of the invention have been described herein for purpose of illustration, it will be appreciated by those skilled in the art that numerous variations of the details may be made without departing from the invention.

What is claimed is:

1. A control system for controlling at least one electronic device, the control system comprising:
at least one RFID device;
a patch comprising an RFID reader antenna, the RFID reader antenna configured to receive a signal from the at least one RFID device;
an RFID reader configured to decode the received signal;
a processor configured to identify at least one command associated with the decoded received signal; and
a transmitter configured to wirelessly transmit the at least one command to the at least one electronic device, the at least one electronic device being separate from the control system.

2. The apparatus of claim 1, further comprising a memory, the memory storing the at least one command.

3. The apparatus of claim 1, wherein the RFID reader antenna generates a wireless field.

4. The apparatus of claim 1, wherein the RFID reader antenna is attached to an article of clothing.

5. The apparatus of claim 1, wherein the RFID device is attached to an article of clothing.

6. The apparatus of claim 1, wherein the patch is movable.

7. The apparatus of claim 1, wherein the at least one electronic device is one of a cellular phone, a music player, a camera, or a camcorder.

8. The apparatus of claim 1, wherein the RFID device is an active type RFID device.

9. The apparatus of claim 1, wherein the at least one electronic device comprises an operating system configured to execute an application, the application configured to receive the at least one command and generate at least one signal to a controlled electronic apparatus in response to the at least one command.

10. The apparatus of claim 9, wherein the controlled electronic apparatus comprises at least one of a camera, a health monitor, or a music player.

11. The apparatus of claim 9, wherein the at least one signal comprises a plurality of steps or commands for the controlled electronic apparatus to perform.

12. A glove for controlling an electronic device, comprising:
a plurality of RFID devices, each RFID device being associated with a unique identifier;
a patch comprising an RFID reader antenna, the RFID reader antenna configured to receive a signal from each of the plurality of devices;
an RFID reader configured to decode each received signal;
a processor configured to identify at least one command associated with each decoded signal; and
a transmitter configured to wirelessly transmit the at least one command to the electronic device, the electronic device being separate from the glove.

13. The glove of claim 12, wherein the plurality of RFID devices are disposed at a plurality of discrete locations within the glove.

14. The glove of claim 13, wherein the unique identifier is associated with one of a stop command, play command, rewind command, fast forward command, pause command, volume up command, and volume down command.

15. A method for an RFID apparatus to change a state of an electronic device, comprising:
   receiving, via a patch comprising an RFID reader antenna, a signal from at least one RFID device;
   decoding, via an RFID reader, the received signal into a unique identifier;
   associating, via a processor, at least one command with the decoded unique identifier; and
   wirelessly transmitting, via a transmitter, the at least one associated command to the electronic device, the electronic device being separate from the RFID apparatus.

16. The method of claim 15, wherein the electronic device is at least one of a media player, a camera, a camcorder, a phone, and a PDA.

17. The method of claim 15, further comprising generating a wireless field via an RFID antenna, wherein the wireless field enables communication with the at least one RFID device.

18. The method of claim 15, further comprising attaching an RFID reader antenna to an article of clothing such that the RFID reader antenna is easily accessible by the at least one RFID device.

19. The method of claim 15, wherein the transmitting the at least one associated command comprises wirelessly transmitting the at least one associated command.

20. The method of claim 15, further comprising:
   receiving the transmission at a first device; and
   converting the received transmission into information for use by one or more applications, wherein each of the one or more applications are configured to control one or more electronic devices.

* * * * *